United States Patent
Chiu (10) Patent No.: US 9,252,702 B2
(45) Date of Patent: Feb. 2, 2016

(54) FRAME FOR SOLAR MODULE AND SOLAR SYSTEM USING THE SAME

(71) Applicant: AU Optronics Corporation, Hsin-Chu (TW)

(72) Inventor: Sih-Siou Chiu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 125 days.

(21) Appl. No.: 14/227,203

(22) Filed: Mar. 27, 2014

(65) Prior Publication Data

US 2014/0290717 A1    Oct. 2, 2014

(30) Foreign Application Priority Data

Apr. 1, 2013  (CN) .......................... 2013 1 0110498

(51) Int. Cl.
| | |
|---|---|
| A47B 96/00 | (2006.01) |
| H02S 20/23 | (2014.01) |
| F24J 2/52 | (2006.01) |
| F24J 2/46 | (2006.01) |

(52) U.S. Cl.
CPC .............. *H02S 20/23* (2014.12); *F24J 2/5211* (2013.01); *F24J 2/5245* (2013.01); *F24J 2/5262* (2013.01); *F24J 2002/4669* (2013.01); *Y02E 10/50* (2013.01)

(58) Field of Classification Search
CPC ......... H02S 20/23; F24J 2/5211; Y02E 10/50
USPC ............... 248/222.11, 222.12, 237; 52/173.3, 52/489.1; 126/623; 136/251, 245
See application file for complete search history.

(56) References Cited

U.S. PATENT DOCUMENTS

| | | | | |
|---|---|---|---|---|
| 4,094,483 | A * | 6/1978 | Busch | F16B 5/0685 248/222.12 |
| 8,557,081 | B2 * | 10/2013 | Sha | F24J 2/5207 136/244 |
| 2009/0000220 | A1 * | 1/2009 | Lenox | F24J 2/5211 52/173.1 |
| 2013/0092806 | A1 * | 4/2013 | Kobayashi | F24J 2/5245 248/205.1 |
| 2013/0125492 | A1 * | 5/2013 | Molek | F24J 2/5211 52/489.1 |
| 2014/0353435 | A1 * | 12/2014 | Liu | F24J 2/5258 248/74.1 |
| 2015/0101655 | A1 * | 4/2015 | Schuit | F16B 2/065 136/251 |
| 2015/0129517 | A1 * | 5/2015 | Wildes | F24J 2/5245 211/41.1 |

FOREIGN PATENT DOCUMENTS

| | | |
|---|---|---|
| TW | M387229 U1 | 8/2010 |
| TW | M388630 U1 | 9/2010 |
| TW | M405133 U1 | 6/2011 |

* cited by examiner

*Primary Examiner* — Gwendolyn Baxter
(74) *Attorney, Agent, or Firm* — WPAT, PC; Justin King (57) ABSTRACT

A bracket is used for supporting at least one solar module each of which has a frame. The bracket includes a fastener, a holder and a fixing element. The fastener includes a top portion and extended portions connected vertically to both sides of the top portion. The top portion has a concave segment at its central position. The holder includes a supporting portion for resisting the bracket. The holder has first through holes, in which the extended portions pass through a plurality of second through holes of the frame and the first through holes of the holder for sandwiching the bracket between the fastener and the holder. The fixing element is used for fixing the fastener on the holder.

20 Claims, 12 Drawing Sheets

FRAME FOR SOLAR MODULE AND SOLAR SYSTEM USING THE SAME

RELATED APPLICATIONS

This application claims priority to China Application Serial Number 201310110498.2, filed Apr. 1, 2013, which is herein incorporated by reference.

BACKGROUND

1. Field of Invention

The present disclosure relates to a solar system. More particularly, the present disclosure relates to a bracket supporting a solar module.

2. Description of Related Art

In recent years, as the world's crude oil reserves have been gradually reduced yearly, an energy issue has become a focus of global attention. In order to solve the crisis of energy exhaustion, various alternative energy developments and utilizations are indeed needed. With the rise of environmental awareness and the solar energy having the advantages of zero pollution and inexhaustibility, the solar energy has become an outstanding focal point in related fields. Therefore, in full sunlight positions, such as roofs of buildings and squares, solar panels are more and more popularly seen.

A solar module often needs to be assembled on a bracket, so as to be fixed on a roof of a building. How to use less tools and steps required for assembling the solar module becomes an important factor for promoting the efficiency of assembling the solar module.

SUMMARY

The present disclosure provides a bracket for a solar module for simplifying steps of assembling a solar system.

An aspect of the present disclosure is to provide a bracket for supporting at least one solar module each of which has a frame. The bracket includes a fastener, a holder and a fixing element. The fastener includes a top portion and extended portions connected and vertical to both sides of the top portion. The top portion has a concave segment at its central position. The holder includes a supporting portion for holding the frame. The holder has first through holes, in which the extended portions are adopted for respectively passing through second through holes of the frame and the first through holes of the holder for sandwiching the frame between the fastener and the holder. The fixing element can fix the fastener on the holder.

In one or more embodiments, the concave segment of the fastener has a first opening, and the holder has a second opening, thereby allowing the fixing element to pass through the first opening and the second opening for connecting the fastener on the holder.

In one or more embodiments, the top portion of the fastener further has two supporting segments located at both sides of the concave segment for sandwiching the frame between the supporting segments of the fastener and the supporting portion of the holder.

In one or more embodiments, the first through holes of the holder are elongated circular holes.

In one or more embodiments, the amounts of the extended portions are two, and the amounts of the first through holes are two, thereby the bracket is adopted for fixing two sets of the frames of the solar modules.

In one or more embodiments, the amounts of the extended portions are four, and the amounts of the first through holes are four, thereby the bracket is adopted for fixing four sets of the frames of the solar modules.

In one or more embodiments, each of the extended portions of the fastener further includes protrusions disposed at end of the extended portions.

In one or more embodiments, the holder further includes a restricting portion disposed vertically on an edge of the supporting portion, and protrusions disposed at the supporting portion.

In one or more embodiments, the frame further includes a supporting rack, in which the supporting rack includes a base, a junction portion and a triangular connecting portion connecting the base to the junction portion. The supporting portion of the holder is adopted to be fixed to the junction portion by using the fixing element.

In one or more embodiments, the supporting rack further includes a supporting rib which is disposed inside the triangular connecting portion and is parallel to the base.

In one or more embodiments, the supporting rack further includes a reinforcing rib disposed inside the triangular connecting portion, in which an angle between the reinforcing rib and the base is between 30° and 65°.

Another aspect of the present disclosure is to provide a solar system. The solar system includes at least one solar module, a fastener, a holder and a fixing element. The solar module includes a solar panel and a frame for fixing the solar panel. The frame includes a clamping portion, a protruding portion and a connecting portion. The clamping portion is used for clamping the solar panel. The protruding portion is located at outside of the frame which is opposite to the solar panel, and has the first through holes. The connecting portion connects the clamping portion to the protruding portion. The fastener includes a top portion and extended portions connected and vertical to both sides of the top portion. The top portion has a concave segment at its central position. The holder includes a supporting portion for holding the frame. The holder has second through holes corresponding to the first through holes of the frame. The extended portions of the fastener are adopted for passing through the first through holes and the second through holes of the holder respectively for sandwiching the frame between the fastener and the holder. The fixing element can fix the fastener on the holder.

In one or more embodiments, the concave segment of the fastener has a first opening and the holder has a second opening, thereby allowing the fixing element to pass through the first opening and the second opening for fixing the fastener on the holder.

In one or more embodiments, the top portion of the fastener further has two supporting segments located at both sides of the concave segment for sandwiching the protruding portion of the frame between the supporting segments of the fastener and the supporting portion of the holder.

In one or more embodiments, the first through holes and the second through holes are elongated circular holes, and a length of the extended portions is more than a thickness of the protruding portion of the frame.

In one or more embodiments, the amounts of the extended portions of the fastener are two, and the amounts of the second through holes on the holder are two, thereby the fastener and the holder are adopted for fixing two sets of the frames of the solar modules.

In one or more embodiments, the amounts of the extended portions of fastener are four, and the amount of the second through holes on the holder are four, thereby the fastener and the holder are adopted for fixing four sets of the frames of the solar modules.

In one or more embodiments, the solar system further includes a supporting rack, in which the supporting rack includes a base, a junction portion and a triangular connecting portion connecting the base and the junction portion. The supporting portion of the holder is adopted to be fixed to the junction portion by using the fixing element.

In one or more embodiments, the supporting rack further includes a supporting rib which is disposed inside the triangular connecting portion and is parallel to the base.

In one or more embodiments, the supporting rack further includes a reinforcing rib disposed inside the triangular connecting portion, in which an angle between the reinforcing rib and the base is between 30° and 65°.

DETAILED DESCRIPTION

The spirit of the present disclosure is described as figures and detailed description in considerable detail. It will be apparent to those skilled in the art that, after understanding the preferred embodiments of the present disclosure, various modifications and variations can be made to the features disclosed in the present disclosure without departing from the scope or spirit of the disclosure.

Figure 1A:
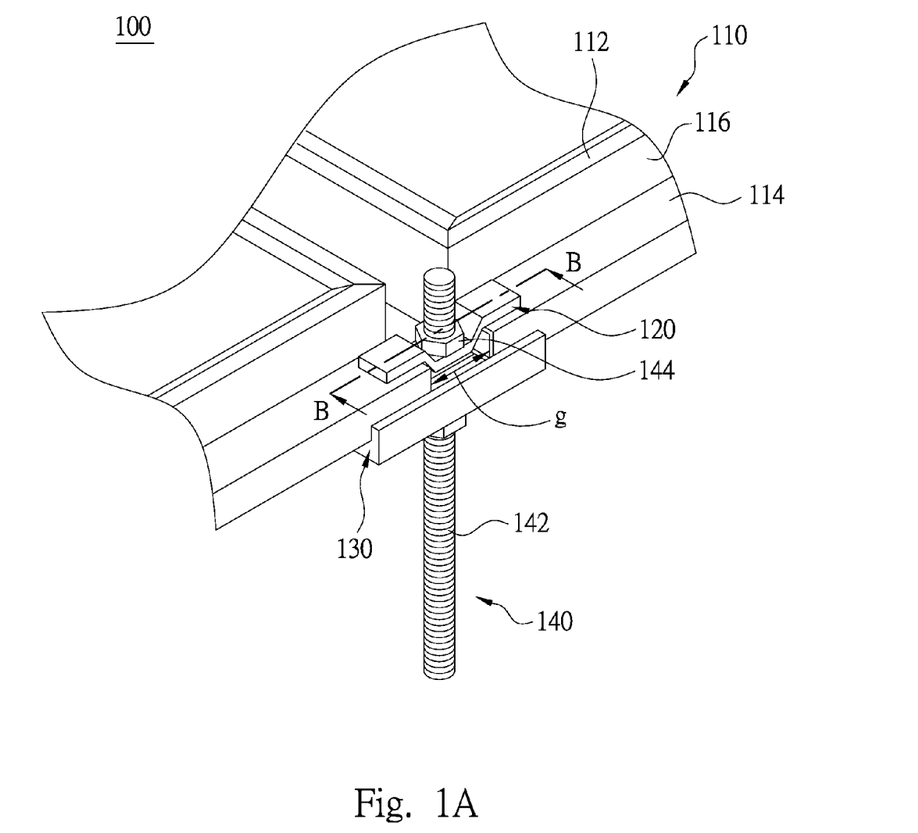
FIG. 1A and FIG. 1B are schematic partial 3D and exploded diagrams showing a frame for a solar system in accordance with an embodiment.
Figure 1B:
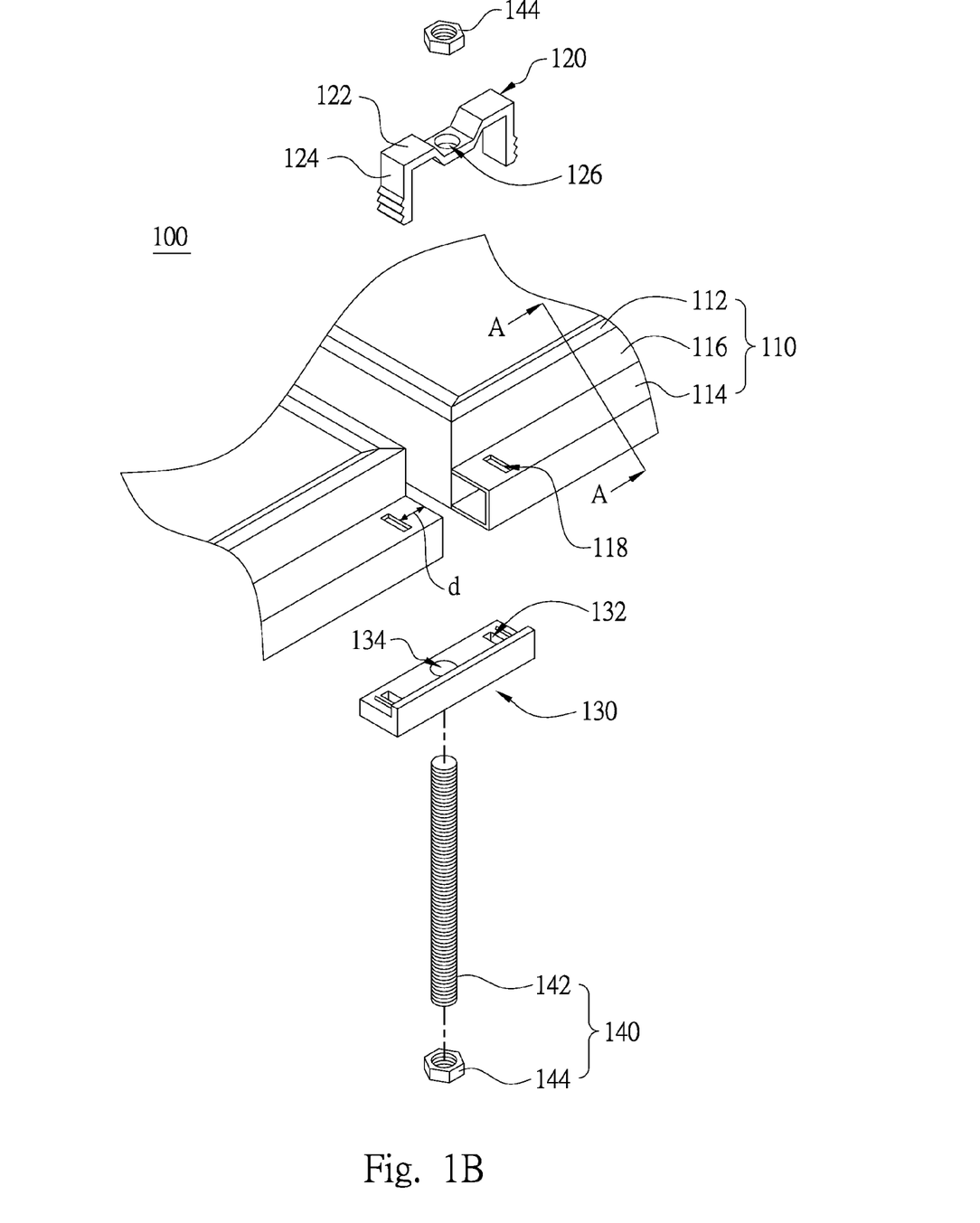

Referring to FIG. 1A and FIG. 1B, FIG. 1A and FIG. 1B are schematic partial 3D and exploded diagrams showing an assembled solar system in accordance with an embodiment. The solar system 100 includes a solar module and a bracket used to support the solar module. The solar module includes a solar panel and a frame 110. The bracket of the solar module includes a fastener 120, a holder 130 and a fixing element 140. The frame 110 includes a clamping portion 112 for clamping the solar panel, a protruding portion 114 and a connecting portion 116 connecting the clamping portion 112 to the protruding portion 114. The protruding portion 114 is extended outward from a lower edge of the connecting portion 116, and at least one end on left or right side of the protruding portion 114 has a first through hole 118.

The fastener 120 includes a top portion 122 and extended portions 124 connected vertically to both sides of the top portion 122. The two extended portions 124 may be adopted for passing through the two first through holes 118 on the two adjacent protruding portions 114 of the two frames 110 for connection and fixing therebetween.

Further, two frames 110 have respective protruding portions 114. The first through hole 118 is disposed at one end on left or right side of the protruding portion 114. When two frames 110 are disposed close to each other, two first through holes 118 are also adjacent to each other. The extended portions 124 of the fastener 120 may be adopted for passing through the two adjacent first through holes 118, thereby enabling the fastener 120 to be a cross-bridge structure to connect the two frames 110.

The holder 130 has second through holes 132 for corresponding to the first through holes 118 of the frames 110. The extended portions 124 of the fastener 120 further be adopted for passing through the second through holes 132 for fixing the protruding portion 114 of the frame between the fastener 120 and the holder 130 i.e., an upper surface of the protruding portion 114 contacts a lower surface of the fastener 120, and a lower surface of the protruding portion 114 contacts an upper surface of the holder 130. The first through holes 118 and the second through holes 132 may be elongated circular holes. The elongated circular hole may be the shape of a rectangular opening with rounded corners.

The top portion 122 of the fastener 120 has a first opening 126, and the holder 130 includes a second opening 134 for corresponding to the first opening 126. The two adjacent frames 110 do not contact each other and keep a gap "g" therebetween. The positions of the first opening 126 and the second opening 134 are overlapping among the gap "g".

The fixing element 140 includes a hanger bolt 142 and nuts 144. The hanger bolt 142 is used to pass through the first opening 126 and the second opening 134. The nuts 144 are used to fix on the hanger bolt 142 for fixing the hanger bolt 142, the fastener 120 and the holder 130 together. Further, when the hanger bolt 142 passes through the first opening 126 and the second opening 134, the nuts 144 are screwed from both ends of the hanger bolt 142 until contacting the fastener 120 and the holder 130 respectively. Therefore, the fastener 120 and the holder 130 are fixed between the nuts 144, and the protruding portion 114 of the frame 110 is sandwiched between the fastener 120 and the holder 130.

As a result, the efficacy of rapidly and conveniently assembling the solar system can be achieved.

Beside the aforementioned fixing element 140 can fix the fastener 120 and the holder 130, the length of the hanger bolt 142 thereof may be further increased so as to be fixed on a roof structure made of metal or asphalt, for example. In that way, the solar system 100 may be fixed directly on the roof accordingly.

Figure 2:
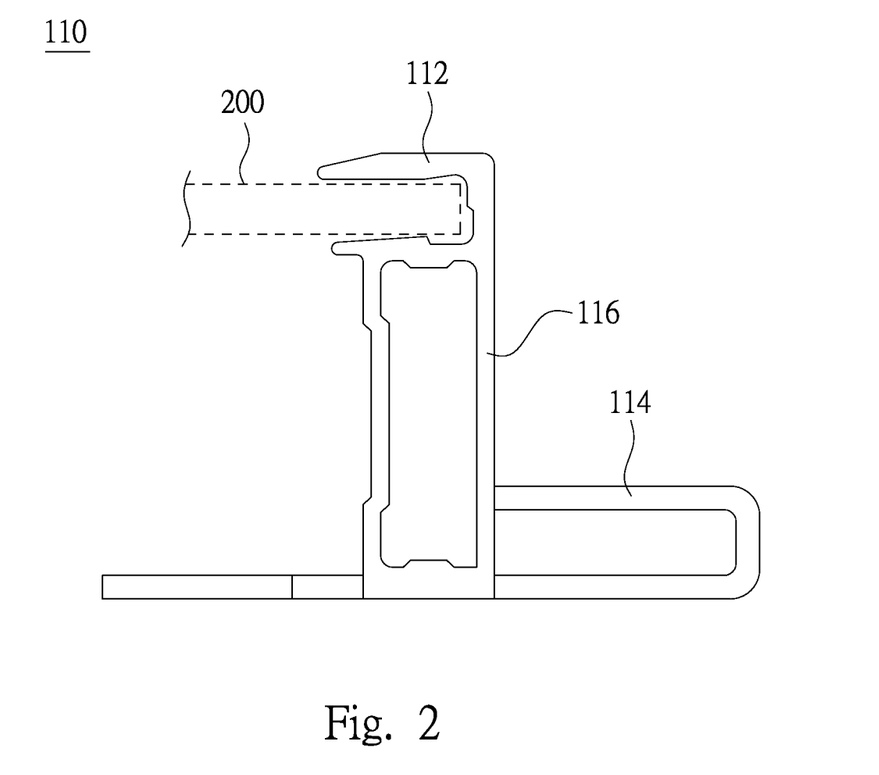
FIG. 2 is a schematic cross-sectional diagram showing the bracket in FIG. 1B.

Referring to FIG. 1B together with FIG. 2, FIG. 2 is a schematic cross-sectional diagram showing the frame 110 viewed along a line A-A in FIG. 1B. Each frame 110 includes a clamping portion 112 for clamping the solar panel 200, a protruding portion 114 and a connecting portion 116 connecting the clamping portion 112 to the protruding portion 114. The clamping portion 112 is located at an upper end of the connecting portion 116, and has an opening toward the internal side of the frame 110 for clamping the solar panel 200. The protruding portion 114 is extended outward from a lower end of the connecting portion 116. After being assembled, the solar panel 200 and the protruding portion 114 extends outwardly from opposite sides of the connecting portion 116 respectively. The frame 110 may be made from metal, and preferably from aluminum with a relative lightweight.

A distance "d" between a first through hole 118 (in FIG. 1B) and an edge on the left or right side of the protruding portion 114 is ranged from 10 mm to 20 mm. The first through hole 118 would not be too close to an edge of the frame 110 in the condition that the distance between the first through hole 118 and the edge of the protruding portion 114 is more than 10 mm. Therefore it can prevent the first through hole 118 from the deformation in the future due to the amount of material therebetween is not enough for keeping strength. On the other hand, when the distance d between the first through hole 118 and the edge of the protruding portion 114, or the edge of the frame 110 is less than 20 mm, the cost of material of the fastener 120 can be reduced.

Figure 3:
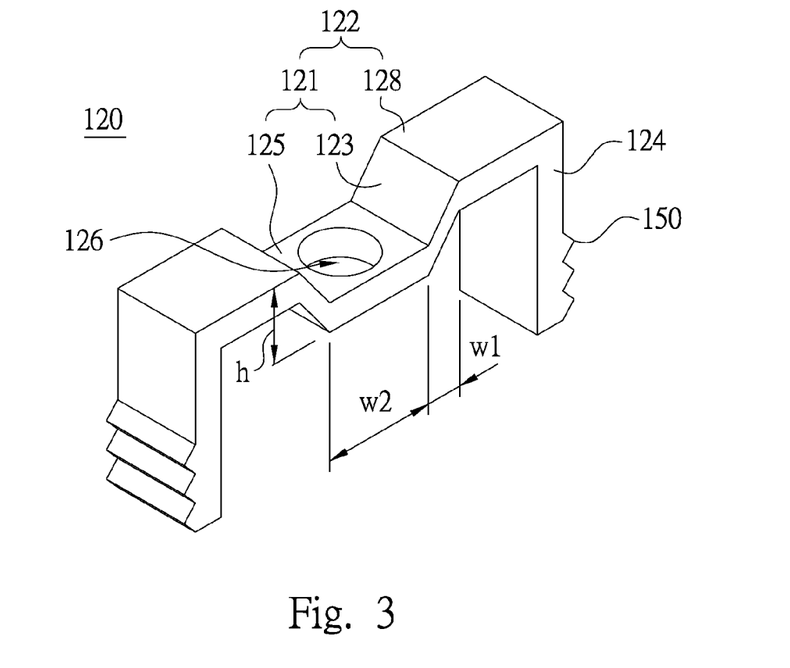
FIG. 3 is a schematic 3D diagram showing the fastener in FIG. 1B.

Referring to FIG. 1B together with FIG. 3, FIG. 3 is a schematic 3D diagram showing the fastener 120 in FIG. 1B. The fastener 120 includes a top portion 122 and extended portions 124 connected vertically to both sides of the top portion 122, and the amount of the extended portions 124 are two. The top portion 122 of the fastener 120 includes a concave segment 121 and supporting segments 128. The supporting segments 128 are connected respectively to both sides of the concave segment 121 and the concave segment 121 is shifted to the different plane relative to that of the supporting segments 128. The first opening 126 is disposed at the concave segment 121. Further, the concave segment 121 has two inclined portions 123 and a sunken portion 125. One of the inclined portions 123 connects the sunken portion 125 to one of the supporting segments 128 on the left side, and the other one of the inclined portions 123 connects the sunken portion 125 to the other one of the supporting segments 128 on the right side.

As a result, when the fastener 120 connects the frame 110 and the holder 130 with fixing elements 140 together, the sunken portion 125 may be positioned to shorten the gap distance between the fastener 120 and the holder 130. This kind of design can prevent the situation of deformation or bending of the fastener 120 or the hanger bolt 142 in the future due to the large external force. A reacting force can be generated on both ends at a lower side of the sunken portion 125 when this part contacts the adjacent frame 110. It also can reduce the influence of a downward pressure on the fastener 120 when the downward pressure is generated from the operation of fixing the fastener 120, the protruding portion 114 of frame 110 and the holder 130 with hanger bolt 142 and nut 144.

A distance "h" between a supporting segment 128 and the sunken portion 125 is in a range from 5 mm to 10 mm. If the distance "h" is less than 5 mm, a height-reducing efficacy cannot be achieved due to too small step difference. If the distance "h" is greater than 10 mm, the step difference is too large and, thus increasing the deformation possibility of the fastener 120. A width "w1" of the inclined portion 123 is in a range from 5 mm to 10 mm approximately. If the width "w1" is less than the 5 mm, the inclined portion 123 is slanted acutely, and stress concentration may happen on thereon. If the width "w1" is more than 10 mm, it means more material for the fastener 120 is needed and a distance between the adjacent frames 110 is increased. A width "w2" of the sunken portion 125 is 25 mm to 35 mm approximately. The minimum width "w2" of the sunken portion 125 has to allow the hanger bolt 142 passing through the sunken portion 125. Further, the width "w2" of the sunken portion 125 does not need to be too broad, so as to save material consumption and reduce the distance between the two adjacent frames 110. The gap "g" in FIG. 1A is approximately equaled to 2w1+w2.

The fastener 120 further optionally includes protrusions 150. The protrusions 150 are disposed at an outer surface of the extended portions 124.

The protrusions 150 may be V-shaped ribs as illustrated in the present embodiment or any other random shapes. The protrusions 150 can destroy an anodized layer (insulated layer) on a surface of the frame 110 by rubbing when an extended portion 124 is passing through the first through hole 118 of the frame 110. It also can ground frame 110 through these protrusions 150 on the extended portions 124 of the fastener 120. Further, the protrusions 150 are also used to further make the combination between the fastener 120 and the frame 110 firmly.

Figure 4:
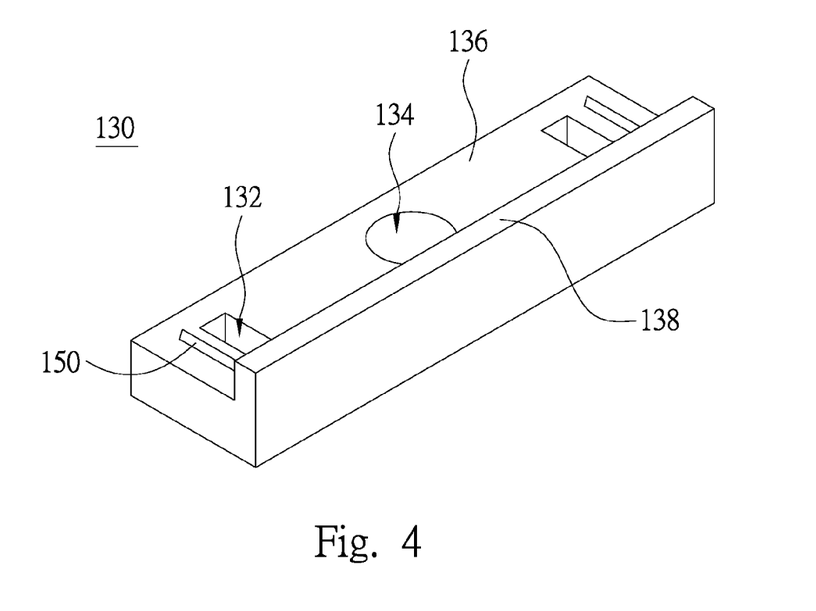
FIG. 4 is a schematic 3D diagram showing the holder in FIG. 1B.

Referring to FIG. 1B together with FIG. 4, FIG. 4 is a schematic 3D diagram showing the holder 130 in FIG. 1B. The holder 130 includes a supporting portion 136 and a restricting portion 138 disposed upright on the supporting portion 136. The restricting portion 138 is disposed upright on an end of the supporting portion 136, such that a side cross-section of the holder 130 is substantially a L-shaped structure. The second through holes 132 and the second opening 134 are all located in the supporting portion 136. The restricting portion 138 is used to position the frame 110.

Similarly, the holder 130 further includes protrusions 150 selectively. The protrusions 150 may be disposed on the supporting portion 136. The protrusions 150 can destroy an anodized layer (insulated layer) on a surface of the frame 110 by rubbing when the frame 110 is fixed between the fastener 120 and the holder 130. It also can ground frame 110 through these protrusions 150 on the extended portions 124 of the holder 130. Further, the protrusions 150 are also used to provide additional friction for further making the combination between the bracket 110 and the holder 130 firmer.

Figure 5:
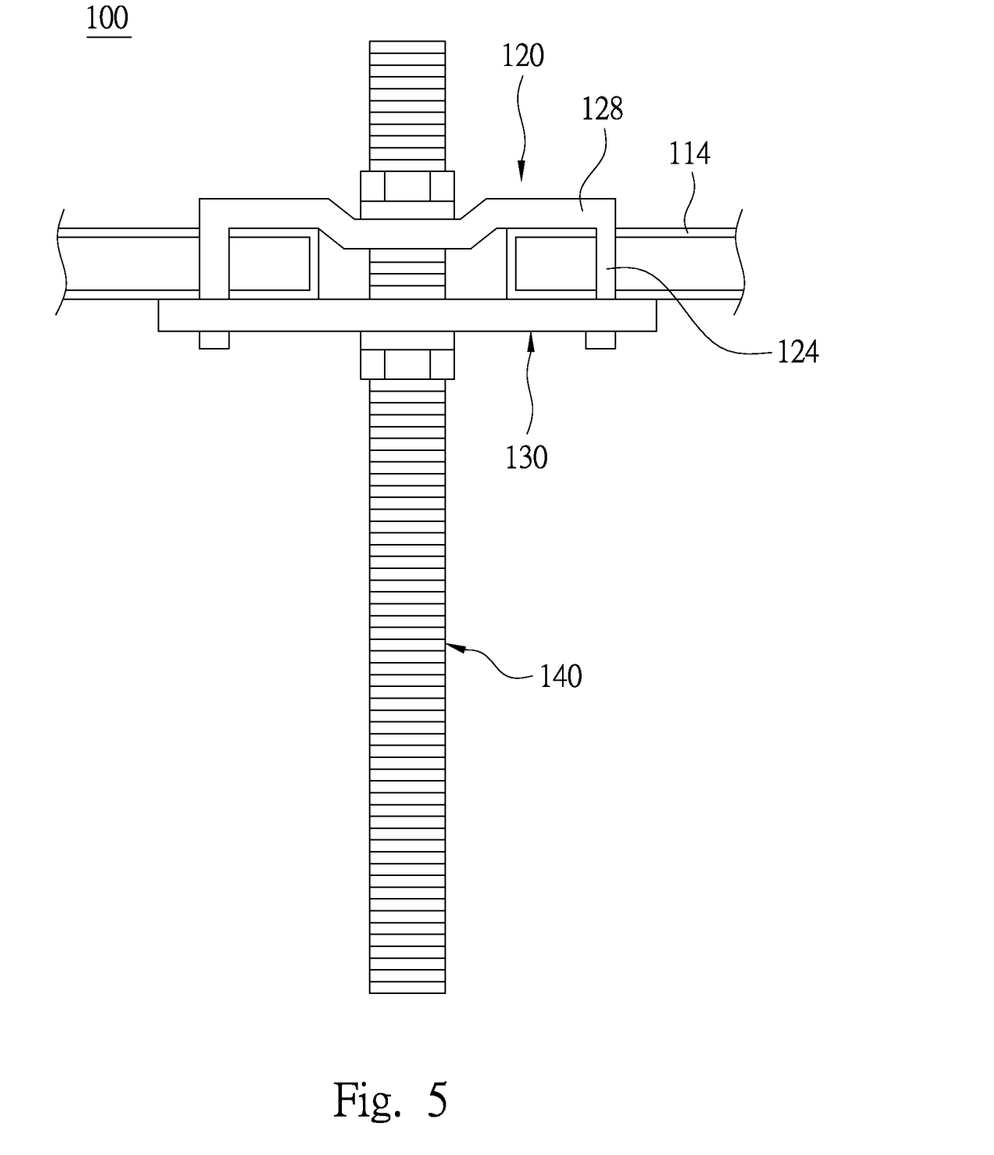
FIG. 5 is a schematic partial cross-sectional diagram showing an assembled solar system in accordance with an embodiment.

Referring to FIG. 5, FIG. 5 is schematic partial cross-sectional diagram showing the assembled solar system viewed along a line B-B in FIG. 1A in accordance with an embodiment. Edges of protruding portions 114 of two adjacent frames 110 are clamped between the fastener 120 and the holder 130. When the fixing element 140 is used to fix the fastener 120 and the holder 130, the protruding portions 114 is securely sandwiched between the fastener 120 and the holder 130.

A distance between a supporting segment 128 of the fastener 120 and the holder 130 is approximately equaled to the thickness of a protruding portion 114 of the frame 110, but it is not limited thereto. The distance may be also approximately less than the thickness of the protruding portion 114. Further, a length of an extended portion 124 of the fastener 120 is preferably more than the total thickness of the protruding portion 114 and the holder 130 so that the extended portion 124 can protrude from the holder 130 and fix the fastener 120 and the holder 130 effectively.

Figure 6A:
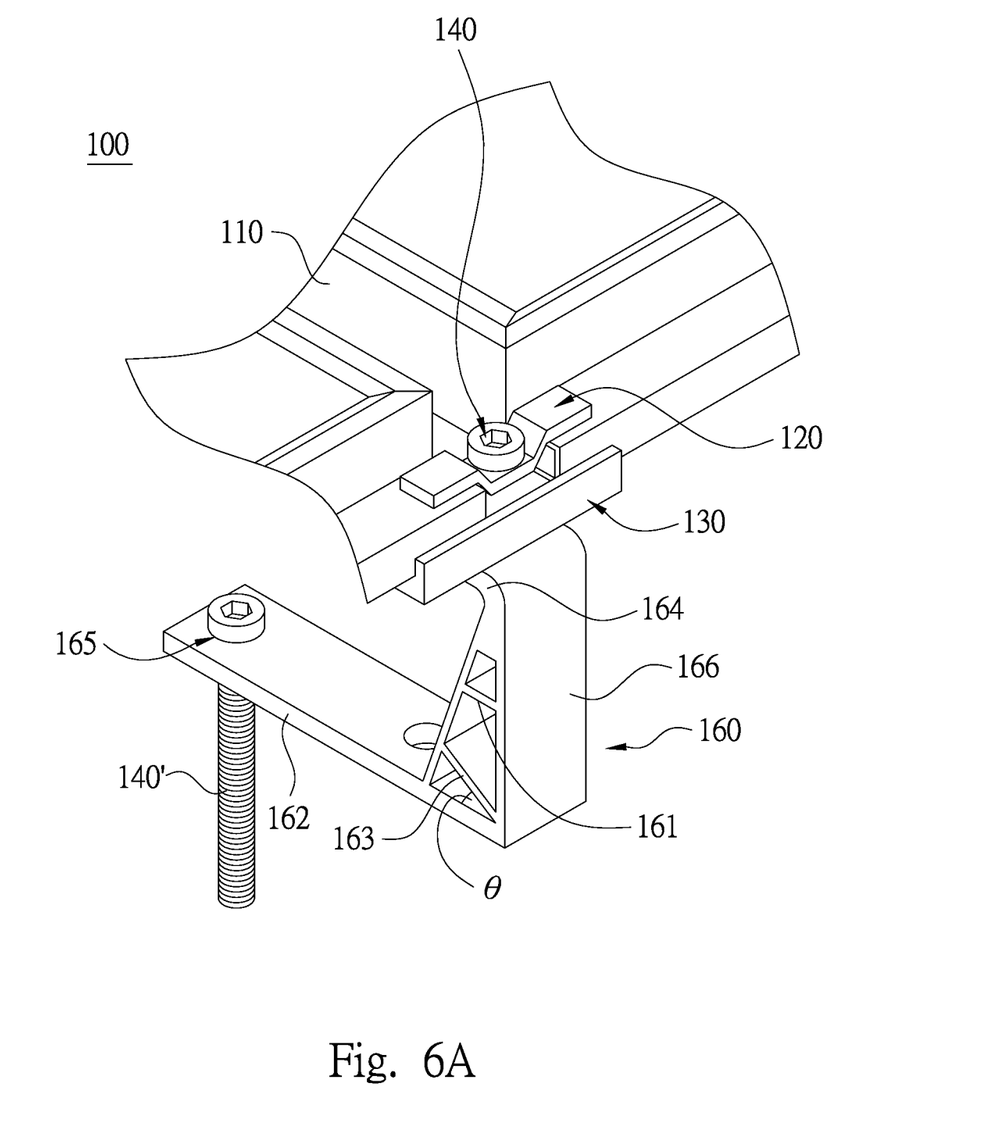
FIG. 6A and FIG. 6B are schematic partial 3D and exploded diagrams showing a frame for a solar module in accordance with another embodiment.
Figure 6B:
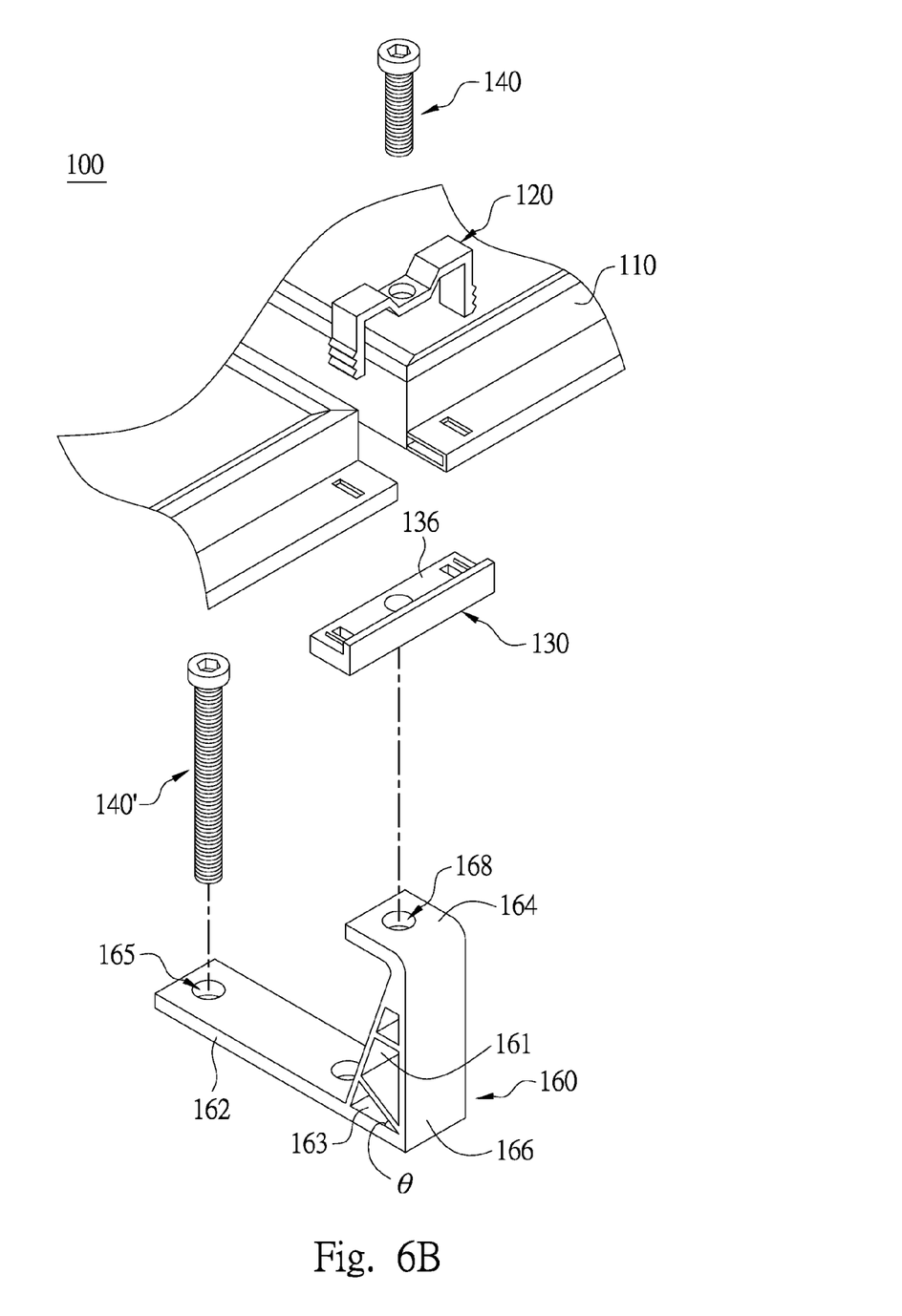

Referring to FIG. 6A and FIG. 6B, FIG. 6A and FIG. 6B are schematic partial 3D and exploded diagrams showing a solar system in accordance with another embodiment. Besides the aforementioned fastener 120, the aforementioned holder 130 and the aforementioned fixing element 140 for fixing frames 110, the present embodiment is different from the previous embodiment in that the solar system 100 further includes a supporting rack 160.

The solar system 100 with the supporting rack 160 may be suitable for installing on a slanted roof. The supporting rack 160 includes a base 162, a junction portion 164 and a triangular connecting portion 166 connecting the base 162 to the junction portion 164, in which the junction portion 164 has a third opening 168. The fixing element 140 is adopted for passing through the third opening 168 for fixing the supporting portion 136 of the holder 130 on the junction portion 164. The base 162 and the junction portion 164 are located at the same side of the triangular connecting portion 166, and are connected to vertices of the triangular connecting portion 166 respectively. The base 162 and the junction portion 164 are parallel. Moreover, the base 162 is parallel and connected to a bottom side of the triangular connecting portion 166.

The triangular connecting portion 166 is used to enhance the connection between the base 162 and the junction portion 164 and reinforce the structure strength of the supporting rack 160. Furthermore, the triangular connecting portion 166 can distribute the stress resulted from the solar module by a broad base portion in order to prevent the deformation of the supporting rack 160 made by an external force.

The supporting rack 160 further includes a supporting rib 161. The supporting rib 161 is disposed inside the triangular connecting portion 166 and is parallel to the base 162. The supporting rib 161 can enhance the structural strength of the triangular connecting portion 166, thereby preventing the triangular connecting portion 166 from deformation caused by the gravitational pressure from the solar panel. The supporting rib 161 is positioned to sustain a stronger force. Therefore, a thickness of the supporting rib 161 (which is one part in the supporting rack 160) is approximately more than that of the other part in the supporting rack 160, thereby enhancing a supporting force of the supporting rib 161.

The supporting rack 160 further includes a reinforcing rib 163. The reinforcing rib 163 is disposed inside the triangular connecting portion 163, in which an angle between the reinforcing rib 163 and the base 162 is between 30° and 65°. As previously described, the supporting rack 160 is used for assembling the solar system on the oblique roof, i.e., the frame is parallel to the roof but is slanted to the ground when the solar system is assembled completely. The downward pressure generated from the solar panel is approximately parallel to the reinforcing rib 163 (which is determined by the oblique angle of the roof and an angle θ between the reinforcing rib 163 and the base 162). The function of the reinforcing rib 163 is used to sustain the downward pressure generated from the solar panel for ensuring the supporting rack 160 not to be deformed by the gravitational pressure.

A screw hole 165 may be further disposed on the base 162 of the supporting rack 160. The solar system 100 may further include another fixing element 140' which is used to fix the supporting rack 160 on a fixture such as a cement block or a roof, after passing through the screw hole 165 of the base 162.

The aforementioned solar system 100 contains the frames 110 which are fixed in pairs. However, through the design changes of the fastener 120 and the holder 130, the frames 110 can also be fixed with a group of four for further saving material cost. The detailed description is illustrated in the following embodiment.

Figure 7A:
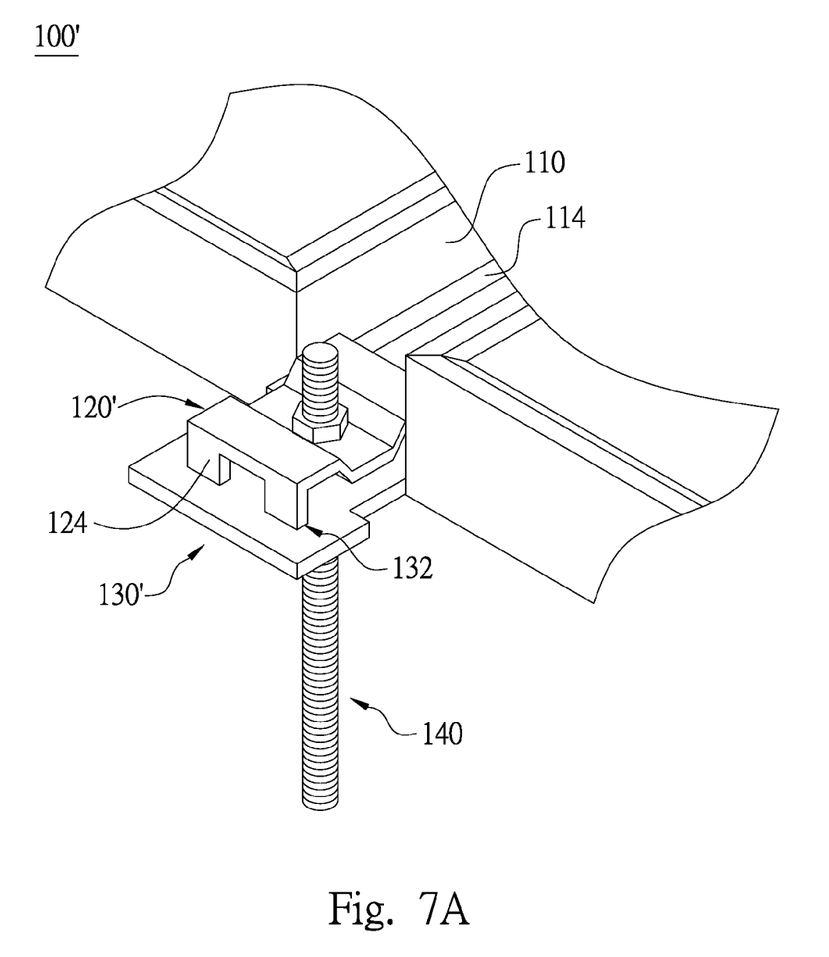
FIG. 7A and FIG. 7B are schematic partial top and bottom views showing a frame for a solar module in accordance with another embodiment.
Figure 7B:
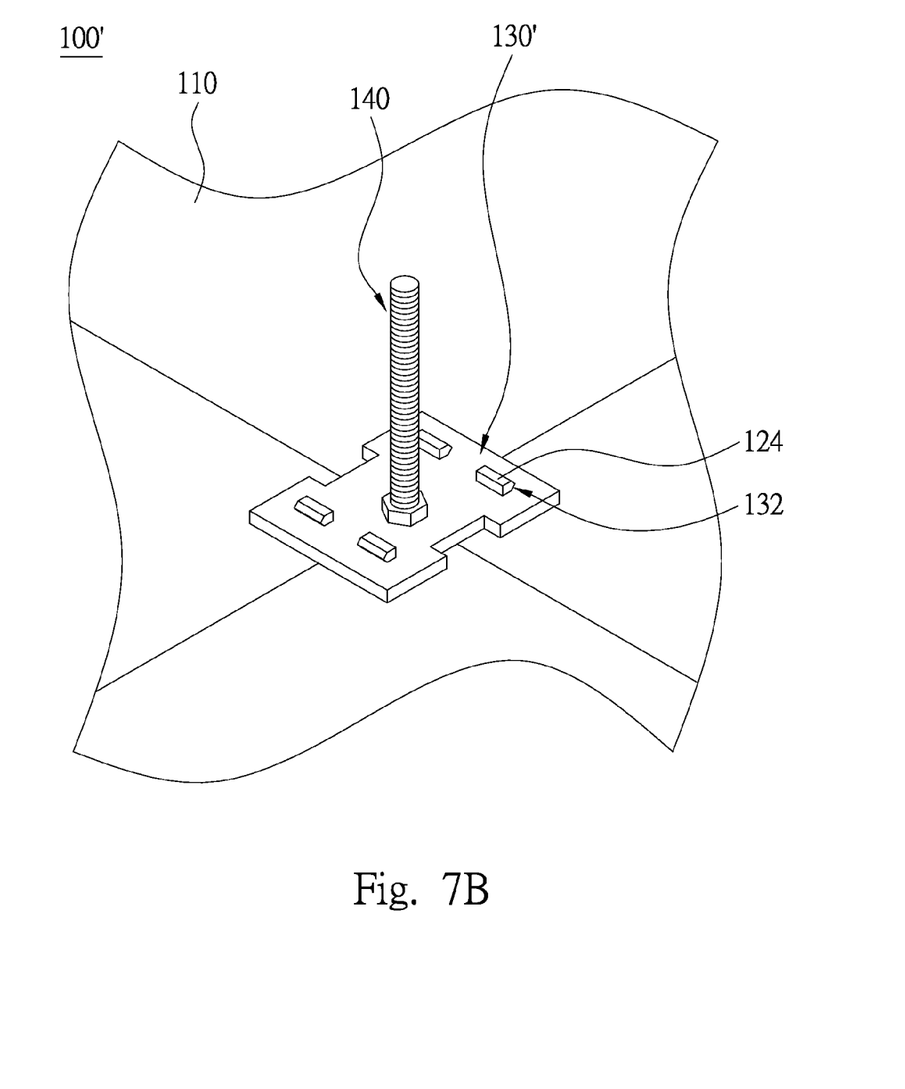

Referring to FIG. 7A and FIG. 7B, FIG. 7A and FIG. 7B are schematic partial top and bottom views showing a solar system in accordance with another embodiment. It is noted that a bracket of the present solar system 100' is used to fix four frames 110 together. However, in the top view, two of the frames 110 are hidden for depicting the features of the present embodiment.

The present embodiment is different from the previous embodiment. A fastener 120' of the present embodiment includes four extended portions 124. A holder 130' of the present embodiment also includes four second through holes 132, too. After the frames 110 are positioned, the extended portions 124 of the fastener 120' are adopted for passing through the first through holes (not shown) on the frames 110 and second through holes 132 on a holder 130' respectively.

The extended portions 124 protrude from the second through holes 132 for connecting the fastener 120' and the holder 130' tightly. The fixing element 140 further passes through the first opening 126 of the fastener 120' and the second opening 134 of the holder 130' for fixing the fastener 120' and the holder 130'. It results that protruding portions 114 of the frames 110 are securely sandwiched between the fastener 120' and the holder 130'.

Figure 8:
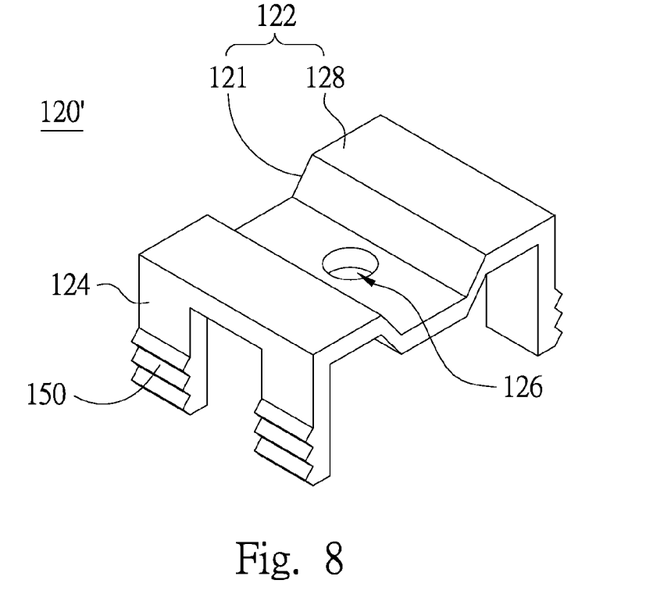
FIG. 8 is a schematic 3D diagram showing the fastener in FIG. 7A.

Referring to FIG. 8, FIG. 8 is a schematic 3D diagram showing the fastener 120' in FIG. 7A. The fastener 120' includes a top portion 122 and extended portions 124. The extended portions 124 are disposed at both sides of the top portion 122 and vertical to the top portion 122. The amounts of the extended portions 124 are four. The top portion 122 includes supporting segments 128 and a concave segment 121 therebetween, and the first opening 126 is located at a center of the concave segment 121. Protrusions 150 may be further disposed on the extended portions 124.

Figure 9:
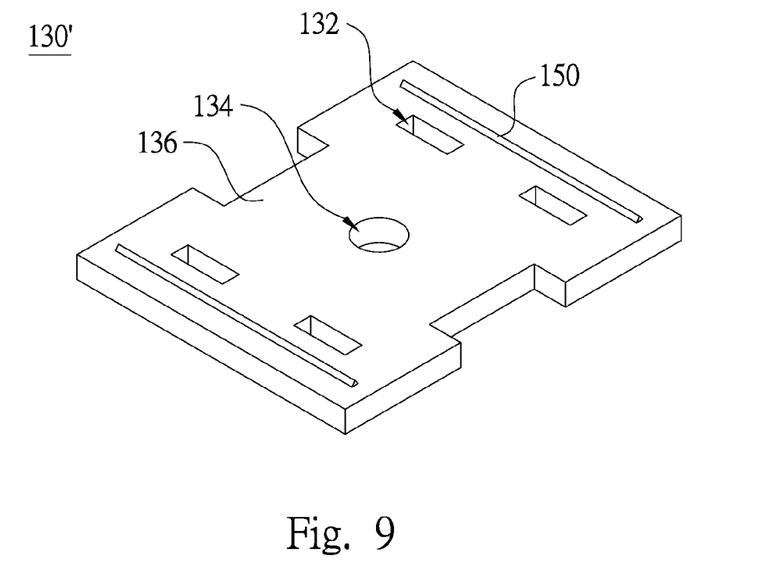
FIG. 9 is a schematic 3D diagram showing the holder in FIG. 7A.

Referring to FIG. 9, FIG. 9 is a schematic 3D diagram showing the holder 130' in FIG. 7A. The holder 130' halves four second through holes 132 and one second opening 134, in which the second opening 134 is located at or near the center of the holder 130'. The holder 130' includes a supporting portion 136. Protrusions 150 may be further disposed on the supporting portion 136 optionally.

Figure 10A:
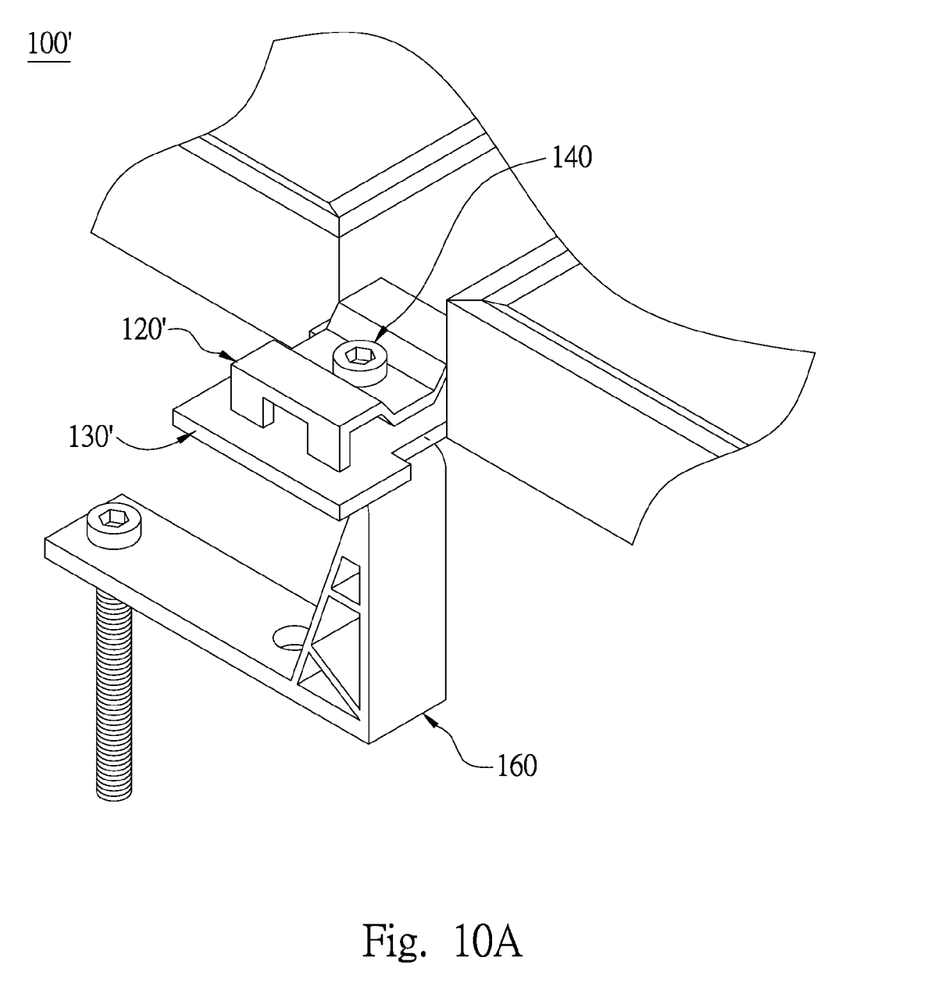
FIG. 10A and FIG. 10B are respectively schematic partial top and bottom views showing a frame for a solar module in accordance with another embodiment.
Figure 10B:
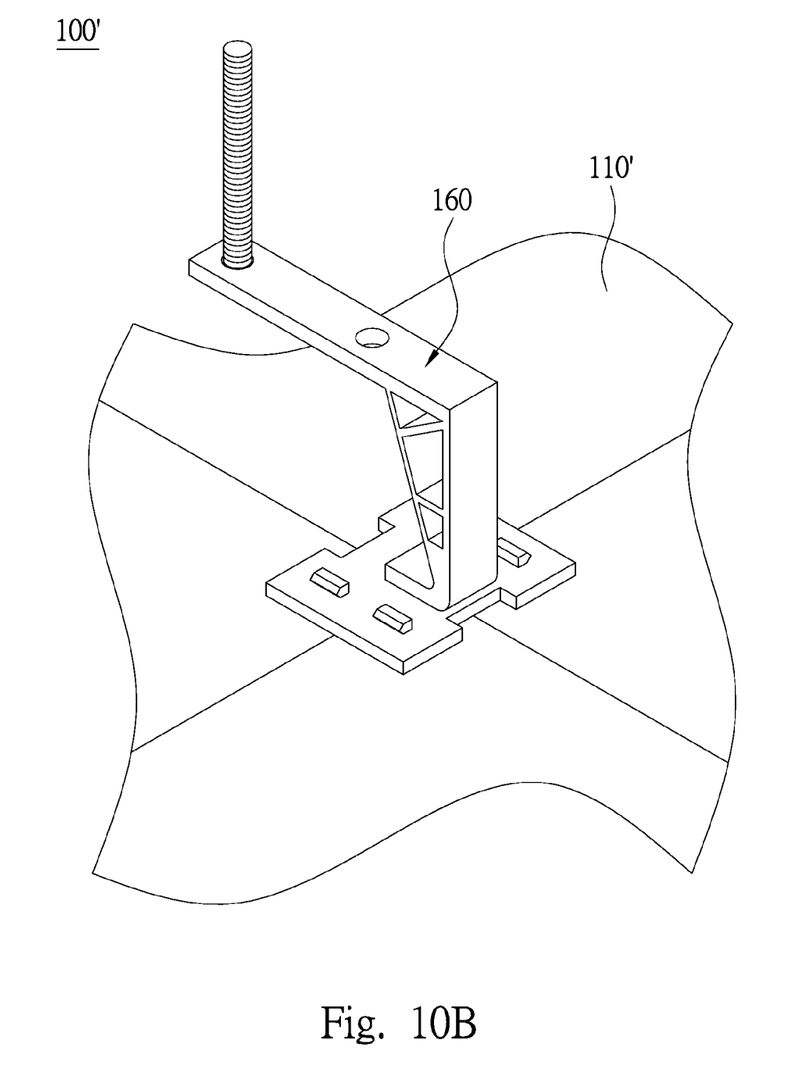

Referring to FIG. 10A and FIG. 10B, FIG. 10A and FIG. 10B are schematic partial top and bottom views showing a solar system in accordance with another embodiment. The present embodiment is different from the previous embodiment. A solar system 100' further includes a supporting rack 160, and a fixing element 140 is fixed on the supporting rack 160 after passing through a fastener 120' and a holder 130'.

Although the present disclosure has been described above as in detailed description, it is not used to limit the present disclosure. It will be intended to those skilled in the art that various modifications and variations can be made to the structure of the present disclosure without departing from the scope or spirit of the disclosure. Therefore, the scope of the disclosure is to be defined solely by the appended claims.

What is claimed is:

1. A bracket for supporting at least one solar module which includes a frame, the bracket comprising:
    a fastener comprising a top portion and a plurality of extended portions connected vertically to both sides of the top portion, the top portion having a concave segment at its central position;
    a holder comprising a supporting portion for holding the frame, the holder having a plurality of first through holes, wherein the extended portions are adopted for respectively passing through a plurality of second through holes of the frame and the first through holes of the holder for sandwiching the frame between the fastener and the holder; and
    a fixing element for fixing the fastener on the holder.

2. The bracket of claim 1, wherein the concave segment of the fastener has a first opening, and the holder has a second opening, thereby allowing the fixing element to pass through the first opening and the second opening for fixing the fastener on the holder.

3. The bracket of claim 1, wherein the top portion of the fastener further has two supporting segments located at both sides of the concave segment for sandwiching the frame between the supporting segments of the fastener and the supporting portion of the holder.

4. The bracket of claim 1, wherein the first through holes of the holder are elongated circular holes.

5. The bracket of claim 1, wherein the amounts of the extended portions are two, and the amounts of the first through holes are two, thereby the bracket is adopted for fixing two sets of the frames of the solar modules.

6. The bracket of claim 1, wherein the amounts of the extended portions are four, and the amounts of the first through holes are four, thereby the bracket is adopted for fixing four sets of the frames of the solar modules.

7. The bracket of claim 1, wherein each of the extended portions further comprises a plurality of protrusions disposed at end of the extended portions.

8. The bracket of claim 1, wherein the holder further comprises a restricting portion disposed vertically on an edge of the supporting portion and a plurality of protrusions disposed at the supporting portion.

9. The bracket of claim 1, further comprising a supporting rack, wherein the supporting rack comprises a base, a junction portion and a triangular connecting portion connecting the base to the junction portion, wherein the supporting portion of the holder is adopted to be fixed to the junction portion by using the fixing element.

10. The bracket of claim 9, wherein the supporting rack further comprises a supporting rib which is disposed inside the triangular connecting portion and is parallel to the base.

11. The bracket of claim 9, wherein the supporting rack further comprises a reinforcing rib disposed inside the triangular connecting portion, wherein an angle between the reinforcing rib and the base is between 30° and 65°.

12. A solar system, comprising:
at least one solar module comprising a solar panel and a frame for fixing the solar panel, wherein the frame comprises:
a clamping portion for clamping the solar panel;
a protruding portion which is located at outside of the frame which is opposite to the solar panel and has a plurality of the first through holes; and
a connecting portion connecting the clamping portion to the protruding portion;
a fastener comprising a top portion and a plurality of extended portions connected and vertical to both sides of the top portion, the top portion having a concave segment at its central position;
a holder comprising a supporting portion for holding the frame, the holder having a plurality of second through holes corresponding to the first through holes of the frame, wherein the extended portions are adopted for passing through the first through holes of the frame and the second through holes of the holder respectively for sandwiching the frame between the fastener and the holder; and
a fixing element for fixing the fastener on the holder.

13. The solar system of claim 12, wherein the concave segment of the fastener has a first opening and the holder has a second opening, thereby allowing the fixing element to pass through the first opening and the second opening for fixing the fastener on the holder.

14. The solar system of claim 12, wherein the top portion of the fastener further has two supporting segments located at both sides of the concave segment for sandwiching the protruding portion of the frame between the supporting segments of the fastener and the supporting portion of the holder.

15. The solar system of claim 12, wherein the first through holes and the second through holes are elongated circular holes, and a length of the extended portions is more than a thickness of the protruding portion of the frame.

16. The solar system of claim 12, wherein the amounts of the extended portions are two, and the amounts of the second through holes are two, thereby the fastener and the holder are adopted for fixing two sets of the frames of the solar modules.

17. The solar system of claim 12, wherein each of the amounts of the frames and the extended portions are four, and the amounts of the second through holes are four, thereby the fastener and the holder are adopted for fixing four sets of the frames of the solar modules.

18. The solar system of claim 12, further comprising a supporting rack, wherein the supporting rack comprises a base, a junction portion and a triangular connecting portion connecting the base to the junction portion, wherein the supporting portion of the holder is adopted to be fixed to the junction portion by using the fixing element.

19. The solar system of claim 18, wherein the supporting rack further comprises a supporting rib which is disposed inside the triangular connecting portion and is parallel to the base.

20. The solar system of claim 18, wherein the supporting rack further comprises a reinforcing rib disposed inside the triangular connecting portion, wherein an angle between the reinforcing rib and the base is between 30° and 65°.

* * * * *